US011843213B2

(12) United States Patent
Kim et al.

(10) Patent No.: US 11,843,213 B2
(45) Date of Patent: *Dec. 12, 2023

(54) CONNECTOR AND BATTERY MODULE INCLUDING THE SAME

(71) Applicant: Kokam Co., Ltd., Suwon-Si (KR)

(72) Inventors: Hyeong Jong Kim, Suwon (KR); Kang Soo Lee, Suwon (KR); Yong Seon Choi, Suwon (KR)

(73) Assignee: SolarEdge Technologies Korea Limited Company, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,135

(22) Filed: Feb. 18, 2022

(65) Prior Publication Data

US 2022/0238963 A1 Jul. 28, 2022

Related U.S. Application Data

(63) Continuation of application No. 16/451,379, filed on Jun. 25, 2019, now Pat. No. 11,289,774.

(51) Int. Cl.
*H01M 10/04* (2006.01)
*H01R 4/30* (2006.01)
(Continued)

(52) U.S. Cl.
CPC ............ *H01R 4/30* (2013.01); *H01M 50/204* (2021.01); *H01M 50/296* (2021.01);
(Continued)

(58) Field of Classification Search
CPC .. H01M 50/296; H01M 50/51; H01M 50/509; H01M 50/507; H01M 50/204;
(Continued)

(56) References Cited

U.S. PATENT DOCUMENTS 11,289,774 B2 * 3/2022 Kim .................... H01M 50/296
2013/0149918 A1 * 6/2013 Kawai ..................... H01R 13/14
439/754

(Continued)

FOREIGN PATENT DOCUMENTS

KR 20110008700 A 1/2011
KR 101396511 B1 5/2014
(Continued)

*Primary Examiner* — Raymond Alejandro
(74) *Attorney, Agent, or Firm* — Banner & Witcoff, Ltd.

(57) ABSTRACT

A connector has a conductive main body with contact portions to compress a plurality of electrode leads of battery cells. The connector has two push members each with a level surface and an inclined surface on opposing sides of each push member, such that each push member is movable and spaced between the contact portions. and compress the plurality of electrode leads with a corresponding contact portion. The connector has a core member with a second inclined surface, such that the core member is movable in a parallel direction to the contact portion, is located between the two push members, and compresses the two push members against the conductive main body. The connector has a movement mechanism to move the core member in the parallel direction and compress the plurality of electrode leads between the conductive main body and the push members. A battery module may contain the connector.

20 Claims, 6 Drawing Sheets

(51) Int. Cl.
*H01M 50/296* (2021.01)
*H01M 50/204* (2021.01)
*H01M 50/51* (2021.01)
H01M 50/517 (2021.01)
H01M 50/534 (2021.01)
H01M 50/533 (2021.01)

(52) U.S. Cl.
CPC .......... *H01M 50/51* (2021.01); *H01M 50/517* (2021.01); *H01M 50/533* (2021.01); *H01M 50/534* (2021.01)

(58) Field of Classification Search
CPC ............. H01M 50/517; H01M 50/514; H01M 50/533; H01M 50/534; H01M 50/536; H01R 4/30; H01R 4/304; H01R 4/305; H01R 4/32
See application file for complete search history.

(56) References Cited

U.S. PATENT DOCUMENTS

2015/0140393 A1   5/2015   Yamamoto et al.
2019/0305287 A1*  10/2019  Matsui ................ H01M 50/512

FOREIGN PATENT DOCUMENTS

KR       20140102423 A    8/2014
KR         101941257 B1   4/2019

* cited by examiner

CONNECTOR AND BATTERY MODULE INCLUDING THE SAME

CROSS REFERENCE TO RELATED APPLICATIONS

The present application is a continuation of U.S. application Ser. No. 16/451,379, filed Jun. 25, 2019, now U.S. Pat. No. 1,289,774, the content of which is hereby incorporated by reference in its entirety.

BACKGROUND

The present disclosure relates to electrical connectors. More particularly, the present disclosure relates to electrical connectors for battery cells and modules.

Batteries may be used in apparatuses such as automobiles, robots, satellites, portable electronics, such as notebook computers, cameras, mobile phones, MP3 players, etc. Batteries may be classified into primary batteries and secondary batteries, were secondary batteries are rechargeable and capable of storing energy as well as repeated charging and discharging. Existing commercially available secondary batteries may be nickel-cadmium batteries, nickel-hydride batteries, zinc batteries, lithium batteries, and the like. Among them, lithium secondary batteries may have a low self-discharging rate and high energy density.

Lithium secondary batteries may contain a lithium-based oxide and a carbon-based material as a negative electrode active material and a positive electrode active material, respectively. The lithium secondary batteries may include an electrode assembly such as a positive electrode current collector and a negative electrode current collector. The current collectors may be respectively coated with a positive electrode active material and a negative electrode active material, and may be disposed with a separator interposed therebetween. An outer casing may hermetically seal therein the electrode assembly together with an electrolyte solution. Lithium secondary batteries may be classified into different types, such as a lithium ion battery (LIB), a polymer lithium ion battery (PLIB), or the like, depending on the types of the positive electrode active material and the negative electrode active material used therein. Typically, the electrodes of lithium secondary batteries may be formed by applying a positive electrode or negative electrode active material to a current collector such as an aluminum or copper sheet, a mesh, a film, or a foil, and then drying the active material.

A single battery cell may be used as a secondary battery, or two or more battery cells may be connected in series and/or in parallel in a single battery module. The battery module may output higher power or store more energy than a single cell. Battery systems may be used in large-sized equipment with suitable large size or number of battery modules. Since it is necessary for the battery system of large equipment to output high power and/or to have a large capacity, a plurality of battery cells may be used connected in series and/or in parallel.

Conventionally, the battery cells may be electrically connected to each other through a welding or bolting method, after bending electrode leads of respective battery cells and bringing the electrode leads into contact with each other. However, in the case of the welding method, a weld defect may occur, and when damage or an abnormal phenomenon occurs in any one or more of the plurality of welded and connected battery cells, it may not be possible to field repair the damage. In the case of a bolting method, time is needed to disassemble the module, remove the damaged cell, and rebuild the module.

SUMMARY OF THE INVENTION

The following summary is a short summary of some of the inventive concepts for illustrative purposes only and is not an extensive overview, and is not intended to identify key or critical elements, or to limit or constrain the inventions and examples in the detailed description. One skilled in the an may recognize other novel combinations and features from the detailed description.

The present disclosure may provide a connector capable of easily interconnecting a plurality of battery cells electrically, and a battery module including the same.

In addition, the present disclosure provides a connector capable of supporting a plurality of battery cells, and a battery module including the sane. The connector may allow removing old battery cells and/or connected new battery cells to the module, such as when a defect or damage has occurred in a cell, only that cell may be replaced.

According to an aspect of the present disclosure, there is provided a connector configured to electrically interconnect electrode leads of neighboring battery cells. The connector includes: a main body having a conductive material and comprising contact portions provided to face each other such that the leads of the neighboring battery cells may be brought into contact with the contact portions, respectively; a pair of push members disposed to be movable and to be spaced apart from each other between the contact portions so as to bring each of the electrode leads into contact with a corresponding contact portion among the contact portions; a core member disposed to be movable between the pair of push members so as to bring the push members into close contact with corresponding contact portions, respectively; and a movement mechanism configured to move the core member in a second direction crossing a first direction in order to cause the push members in the first direction for close contact.

The pair of push members may be disposed to face each other.

The core member may simultaneously bring the pair of push members into close contact with opposite portions.

The movement module may include at least one first fastening hole formed in the main body, at least one second fastening hole forted in the core member, and a bolt member inserted into the first fastening hole and the second fastening hole and passing through a space between the pair of push members. The movement module may be any other mechanism that causes movement of the core member in a second direction crossing a first direction in order to cause the push members in the first direction for close contact such as, but not limited to threaded bolts, partially threaded or unthreaded bolts, screws, magnets, solenoids, springs, latches, engagement handles, clasps, fasteners, rods, pins, nails, or motors such as stepper motors.

The push members may be formed with first inclined portions, respectively, and the core member, which comes into contact with the push members, may be formed with second inclined portions corresponding to the first inclined portions.

The core member may be brought into contact with the push members on a lower side of the push members, and the bolt member may be coupled to the core member from an upper side of the core member.

Meanwhile, according to another aspect of the present disclosure, there is provided a battery module including the connector, and a plurality of cells electrically interconnected by the connector.

The battery module may further include a cell cartridge configured to support the plurality of battery cells in order to stack a plurality of battery cells one on another, and the connector may be coupled to the cell cartridge.

Meanwhile, according to still another aspect, there is provided a battery pack including the battery module described above. In addition, there is provided a vehicle including the battery module.

According to aspects of the present disclosure, it may be possible to easily interconnect a plurality of battery cells electrically through a connector.

In addition, the plurality of battery cells may be interconnected and supported by the connector.

In addition, when a defect or damage has occurred in at least one of the battery cells, it may be possible to release the connection of the connector, replace only the battery in which the defect or damage has occurred, and then connect the connector again. Thus, it may be possible to facilitate replacement of the battery cells.

BRIEF DESCRIPTION OF THE DRAWINGS

These and other features, aspects, and advantages of the present disclosure may become better understood with regard to the following description, claims, and drawings. The present disclosure is illustrated by way of example, and not limited by, the accompanying figures.

DETAILED DESCRIPTION

Figure 1:
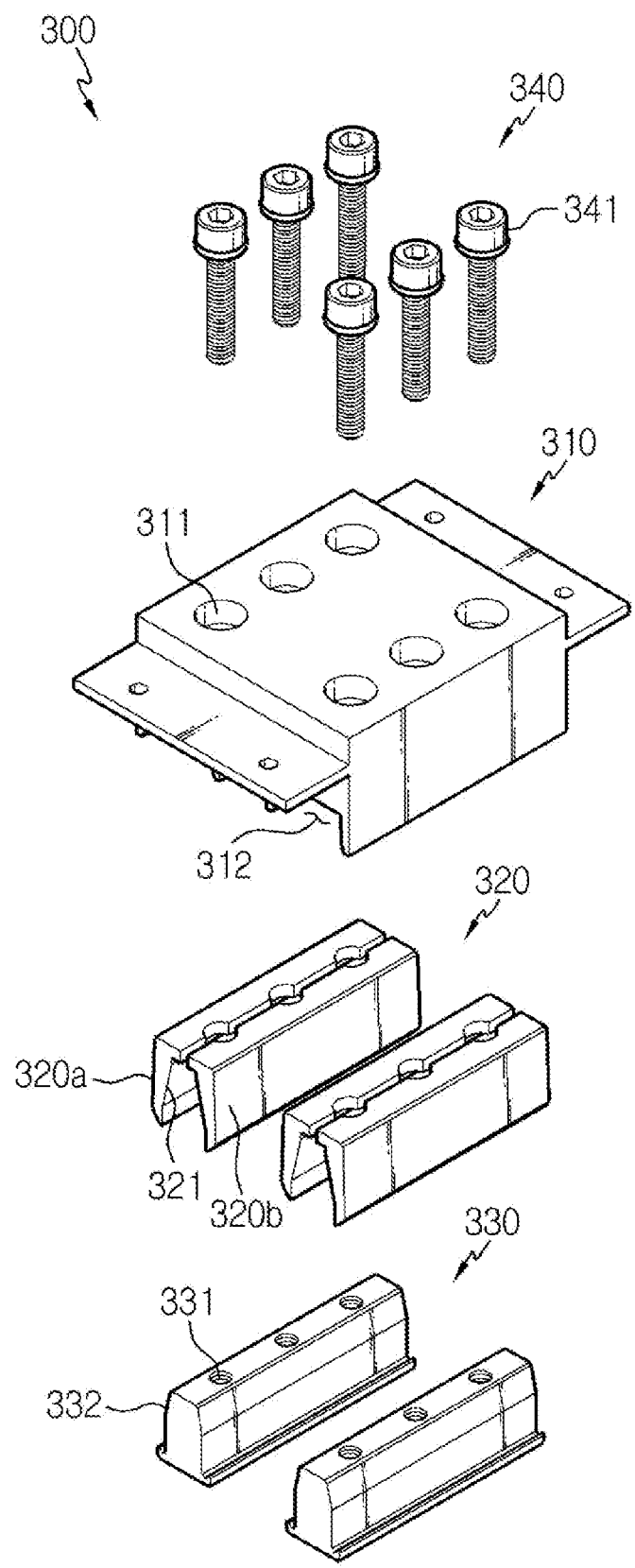
FIG. 1 is an exploded perspective view illustrating a connector according to an aspect of the present disclosure.

Hereinafter, aspects of the present disclosure may be described in detail with reference to the accompanying drawings. The tenor and words used in the specification and claims shall not be construed to be limited to an ordinary or dictionary meaning, but shall be interpreted in a meaning and concept according to the technical idea of the present disclosure based on a principle that the inventor is able to properly define a concept of a term in order to describe his/her invention in the best way. In addition, it shall be noted that because the aspects described in the specification and the configurations illustrated in the drawings are merely illustrative aspects of the present disclosure, and do not represent all the technical ideas of the present disclosure, there may be various equivalents and modifications that may replace the aspects at the time of filing the present application.

In the drawings, the size of each element or a specific portion constituting the element may be exaggerated, omitted or schematically illustrated for convenience and clarity of description. Accordingly, the size of each component may not completely reflect the actual size. In the following description, detailed descriptions of known functions and configurations incorporated herein may be omitted when it may make the subject matter of the present disclosure rather unclear.

The term "coupling" or "connection" used herein is intended to cover not only a case in which one member and another member may be directly coupled or directly coupled, but also a case in which one member is indirectly coupled or connected to another member through a coupling member.

Figure 2:
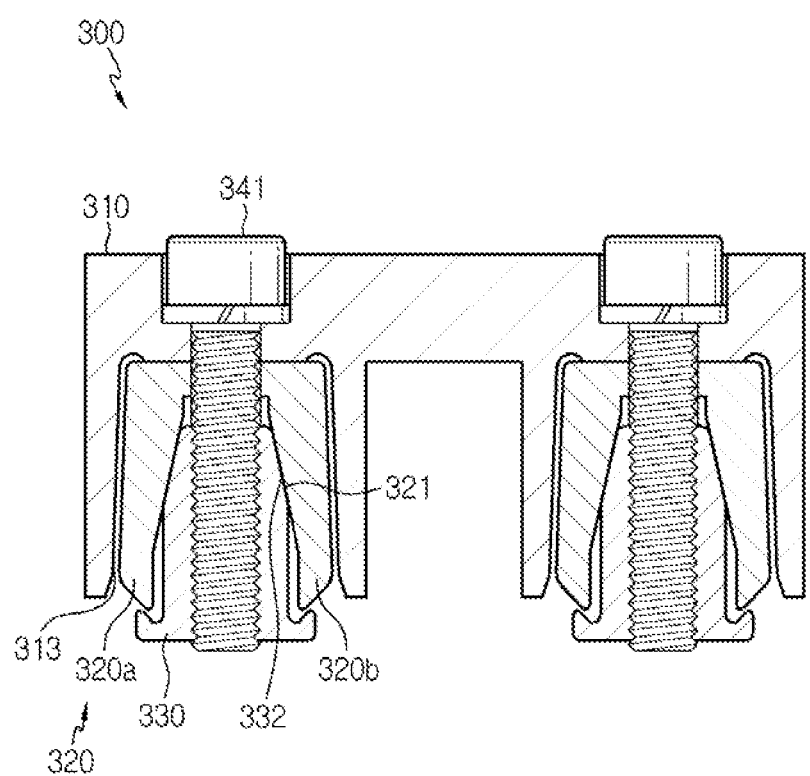
FIG. 2 is a cross-sectional view illustrating the connector according to an aspect of the present disclosure in the assembled state.
Figure 3:
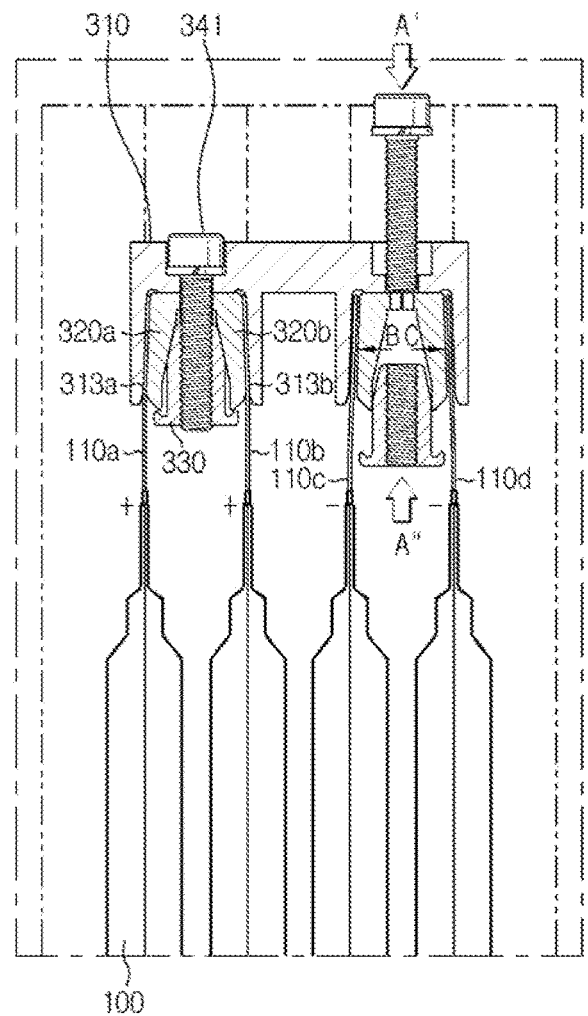
FIG. 3 is a cross-sectional view illustrating the state in which electrode leads of battery cells may be coupled to the connector according to an aspect of the present disclosure.
Figure 4:
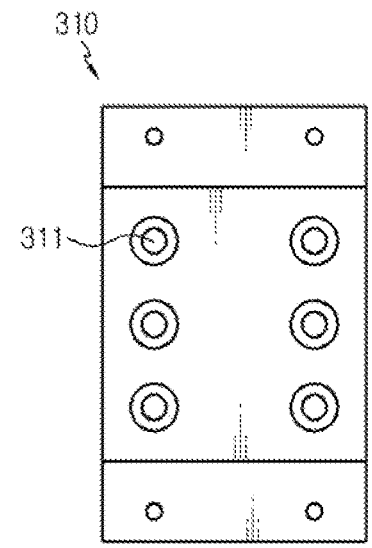
FIG. 4 is a side view illustrating a main body in the connector according to an aspect of the present disclosure.
Figure 5:
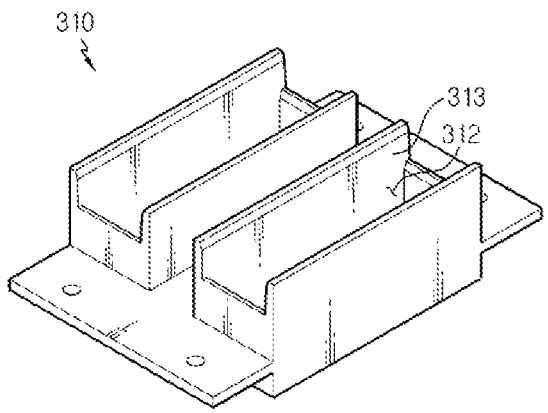
FIG. 5 is a perspective view illustrating the lower side of the main body of the connector according to an aspect of the present disclosure.

FIG. 1 is an exploded perspective view illustrating a connector according to a first aspect of the present disclosure, FIG. 2 is a cross-sectional view illustrating the connector according to the first aspect of the present disclosure in the assembled state, FIG. 3 is a cross-sectional view illustrating the state in which electrode leads of battery cells may be coupled to the connector according to a first aspect of the present disclosure, FIG. 4 is a side view illustrating a main body in the connector according to the fast aspect of the present disclosure, and FIG. 5 is a perspective view illustrating the lower side of the main body of the connector according to the first aspect of the present disclosure.

A connector 300 according to a first aspect of the present disclosure electrically interconnects the electrode leads 110 of neighboring battery cells 100. In this regard, the battery cell(s) 100 may be described first. The battery cell 100 may include a positive electrode plate, a separator, a negative electrode plate, electrode tabs, an electrode lead 110, an active material, an electrolytic solution, an aluminum film layer, and the like, and may be configured in a structure capable of charging and discharging electrical energy by an electrochemical reaction between the constituent elements thereof. The positive electrode plate may be formed, for example, by applying a positive electrode active material to a current collector plate having aluminum (Al). Time negative electrode plate may be formed, for example, by applying a negative electrode active material to a current collector plate having copper (Cu). The separator may be interposed between the positive electrode plate and the negative electrode plate. Each of the electrode tabs may be integrally formed with an electrode plate, that is, the positive electrode plate or the negative electrode plate, and corresponds to an uncoated area in which the electrode active material may not be applied in the electrode plate. That is, the electrode tabs include a positive electrode tab corresponding to an area which may not be coated with the positive electrode active material in the positive electrode plate, and a negative electrode tab corresponding to an area which may not be coated with the negative electrode active material in the negative electrode plate. The electrode leads 110 may be thin metal plates and may be attached to the electrode tabs to extend to the outside of the electrode assembly. The electrode leads 110 include a positive electrode lead attached to the positive electrode tab and a negative electrode lead attached to the negative electrode tab. In addition, the positive electrode lead and the negative electrode lead may extend in the same direction or in opposite directions depending on the formation positions of the positive electrode tab and the negative electrode tab. However, hereinafter, the aspects may be described mainly with reference to the case in which the electrode leads 110 extend in the same direction for convenience of description. The plurality of battery cells 100 may be variously arranged, and the connector 300 electrically interconnects the electrode leads 110 of respective battery cells 100. Here, the plurality of battery cells 100 may be connected in various manners such as, for example, in serial, in parallel, and in serial and parallel. In order to interconnect the plurality of battery cells 100 as described above, a cell cartridge 200 described later may support the plurality of battery cells 100 in order to interconnect the battery cells 100. That is, each of the battery cells 100 may be accommodated in the cell cartridge 200, or may be simply brought into contact with and supported by the cell cartridge 200. In addition, a cartridge assembly having the plurality of cell cartridges 200 may be provided. Meanwhile, as described above, the connector 300 according to the first aspect of the present disclosure electrically interconnects the electrode leads 110 of neighboring battery cells 100, which may be described in detail below.

Referring to FIGS. 1 to 5, the connector 300 according to the first aspect of the present disclosure includes a main body 310, a pair of push members 320a and 320b, a core member 330, and a movement mechanism 340.

The respective electrode leads 110 of neighboring battery cells 100 may come into contact with the main body 310. For example, when the electrode leads 110 of the same polarity of two battery cells 100 are connected to the main body 310, the battery cells 100 may be connected in parallel, and when the electrode leads 110 of different polarities are connected to the main body 310, the battery cells 100 may be connected in series. The main body 310 includes a conductive material such as aluminum or copper for electrically interconnecting the plurality of battery cells 100. However, the material of the main body 310 is not limited thereto, and the main body 310 may include other materials as long as the materials may be conductive. The main body 310 may be provided with contact portions 313 (see FIG. 5) provided to face each other. The electrode leads 110 come into contact with the respective contact portions 313 of the main body 310 so as to be electrically connected. An accommodation space 312 may be formed in the main body 310 to accommodate push members 320 (see FIG. 5). One or more accommodation spaces 312 may be formed in the main body 310. Although two accommodation spaces 312 may be formed in FIGS. 1 and 5, the present disclosure is not limited thereto. As in the second aspect described below, one accommodation space 312 may be provided or three or more accommodation spaces may be provided. However, the first aspect may be described mainly with reference to the case in which two accommodation spaces 312 may be formed in the main body 310 for convenience of description.

The push members 320 may be provided in a pair and accommodated in the accommodation spaces 312 formed in the main body 310. In addition, a pair of push members 320a and 320b may be arranged to face each other in the accommodation space 312. The pair of push members 320a and 320b may be disposed to be spaced apart from each other in the accommodation space 312 and may be movable between the contact portions 313 formed in the main body 310. While the pair of push members 320a and 320b moves between the contact portions 313a and 313b as described above, the electrode leads 110 may be brought into close contact with the corresponding contact portions 313a and 313b, respectively (see FIG. 3). That is, one push member 320a pushes the electrode lead 110a of one of neighboring battery cells 100 to bring the electrode lead 110a into close contact with one contact portion 313a of the main body 310, and the other push member 320b pushes the electrode lead 110b of the other battery cell 100 of the neighboring battery cells 100 to bring the electrode lead 110b into close contact with the remaining contact portion 313b of the main body 310.

The core member 330 may be disposed to be movable between the pair of push members 320a and 320b, and may bring the push members 320 into close contact with the contact portions 313 formed in the main body 310. Here, the core member 330 may simultaneously bring the pair of push members 320a and 3201 into close contact with opposite portions (see arrows B and C in FIG. 3). That is, one push member 320a may be brought into close contact with one contact portion 313a of the main body 310 by the core member 330, and the other push member 320b may be brought into close contact with the other contact portion 313b of the main body 310.

The movement mechanism 340 moves the core member 330 to cause the movement of the push members 320. For example, when the core member 330 moves upward and presses the push members 320 by the movement mechanism 340, the push members 320 may move in the lateral direction which crosses the vertical direction, thereby compressively sandwiching the electrode leads 110 between the push members 320 and the contact portions 313 of the main body 310. That is, in order to move the push members 320 in a first direction for close contact (e.g., in the left-and-right direction with reference to FIG. 2), the movement mechanism 340 moves the core member 330 in a second direction (e.g., in the vertical direction) crossing the first direction. Here, the core member 330 may be movable in a direction orthogonal to the moving direction of the push members 320.

The movement mechanism 340 may include one or more first fastening holes 311 formed in the main body 310, one or more second fastening holes 331 formed in the core member 330, and one or more bolt members 341 in order to cause the movement of the push members 320a and 320b through the movement of the 330 as described above (see FIGS. 1 and 4). In addition, a first inclined portion 321 may be formed on the inner side of each of the push members 320, and a second inclined portion 322 corresponding to the first inclined portion 321 may be formed on the outer side of the core member 330, which comes into contact with the inner side of the push members 320 (see FIGS. 1 and 2). In addition, the core member 330 may come into contact with the push members 320 at the lower side of the push members 320, and the bolt members 341 may be coupled to the core member 330 from the upper side of the core member 330 located at the lower side of the main body 310. The bolt members 341 may pass through the fast fastening holes 311 formed in the main body 310, may pass through a space between the push members 320 interposed between the main body 310 and the core member, and may then be inserted into the second fastening holes 331 in the core member 330. When the bolt members 341 are rotated in the direction of tightening the core member 330 (see arrows A' and A" in FIG. 3), the core member 330 may move upward with reference to FIG. 2 so that the second inclined portions formed on the outer side of the core member 330 come into contact with and press the first inclined portions 321 formed on the inner sides of the push members 320 so as to bring the push members 320 into close contact with the left and right portions (see arrows B and C in FIG. 3). When the bolt members 341 is rotated in the direction of loosening the core member 330, the core member 330 may move downward with reference to FIG. 2 so that the second inclined portions formed on the outer side of the core member 330 may be released from the contact state with the first inclined portions 321 formed on the inner sides of the push members 320 and the push members 320 may be released from the close contact state with the contact portions 313 of the main body 310. Here, the electrode leads 110 moves from the lower side to the upper side of the main body 310, and may be inserted between the main body 310 and the push members 320, and when the push members 320 move in the left-and-right direction, the electrode leads 110 may be compressively sandwiched between the main body 310 and the push members 320.

Hereinafter, the operation and effects of the connector 300 according to the first aspect of the present disclosure may be described.

Referring to FIG. 3, the main body 310 may be formed with two accommodation spaces 312, two electrode leads 110a and 110b may be electrically coupled to the left accommodation space 312, two electrode leads 110c and 110d may be electrically coupled to the right accommodation space 312. The left two electrode leads 110a and 110b and the tight two electrode leads 110c and 110d, that is, four electrode leads 110a, 110b, 110c, and 110d may be all electrically connected to each other. Here, both of the two electrode leads 110a and 110b in the left accommodation space 312 may be, for example, the positive pole, and both of the two electrode leads 110c and 110d in the right accommodation space 312 may be, for example, the negative pole. However, the electrical connection is not limited thereto, and may be more diversified.

When the electrode leads 110c and 110d may be interposed between the contact portions 313 of the main body 310 and the push members 320 as in the housing space 312 on the right side of the main body 310, the bolt members 341 may be inserted into the second fastening holes 331 of the core member 330, and the bolt members 341 may be rotated to tighten the core member 330, the core member 330 moves upward so that the inclined portions 332 of the core member 330 may be brought into contact with the first inclined portions 321 of the push members 320. In addition, as the core member 330 moves upward, the push members 320 may be moved in the left-and-right direction, and as in the left accommodation space 312 of the main body 310, the push members 320 bring the leads 110a and 110b into close contact with the contact portions 313 of the main body 310 having a conductive material so as to electrically connect the electrode leads 110a and 110b to each other.

In addition, when the bolt members 341 are rotated in the direction opposite to the direction in which the core member 330 are tightened so as to loosen the core member 330, the core member 330 may be capable of moving downward so as to cause the push members 320 to be released from the contact with the electrode leads 110a and 110b or 110c and 110d, and so as to cause the main body 310 to be disengaged from the electrode leads 110a and 110b or 110c and 110d. As described above, since the electrode leads 110 may be capable of being easily connected electrically using the connector 300 according to the first aspect of the present disclosure, when a defect or damage has occurred in any one of the plurality of battery cells 100, it may be possible to release the connector 300, remove only the battery cell 100 in which the defect or damage has occurred, and replace the battery cell 100 with a new battery cell 100, and electrically connect the battery cells 100 again through the connector 300, thereby facilitating the electrical connection and replacement of the battery cells 100.

Figure 6:
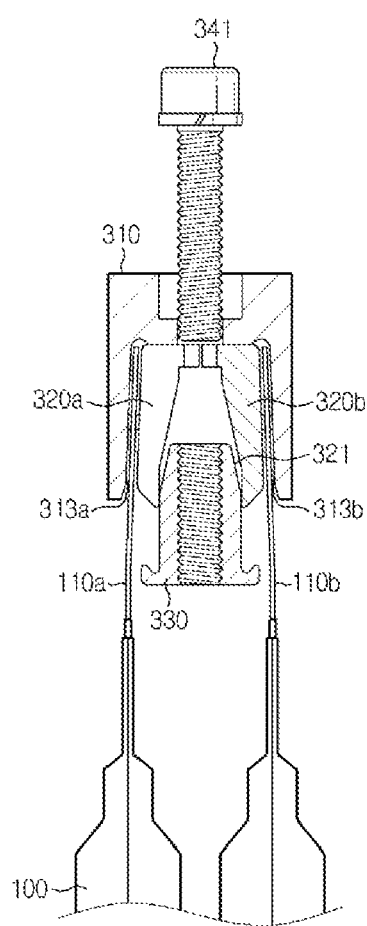
FIGS. 6 and 7 are cross-sectional views illustrating a process of coupling electrode leads of battery cells to a connector according to an aspect of the present disclosure.
Figure 7:
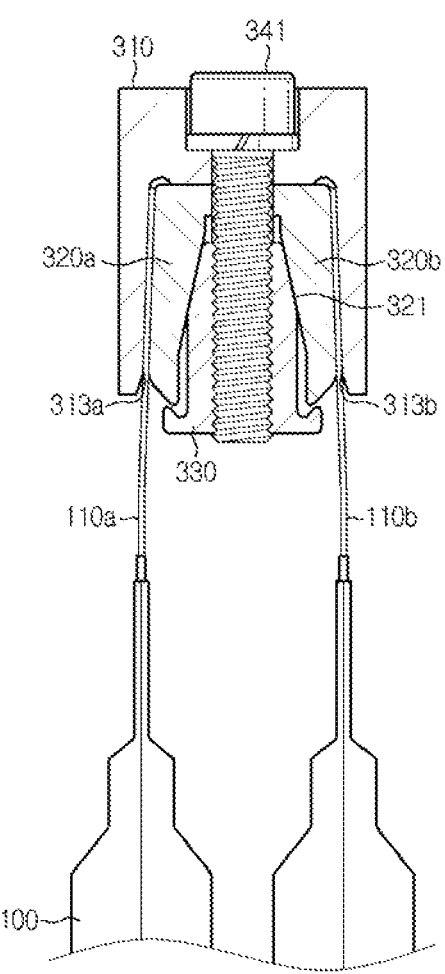

FIGS. 6 and 7 are cross-sectional views illustrating a process of coupling electrode leads of battery cells to a connector according to a second aspect of the present disclosure.

Hereinafter, a connector 300 according to a second aspect of the present disclosure may be described with reference to the drawings. However, the portions common to those of the connector 300 according to the first aspect of the present disclosure are not redundantly described.

Referring to FIGS. 6 and 7, the second aspect of the present invention differs from the first aspect in that the main body 310 may be provided with one accommodation space 312. However, since the electrical connection and release processes of the electrode leads 110 may be common to those in the first aspect, a redundant description thereof may be omitted.

Since the number of cases of serial, parallel, or serial-parallel connection may be further increased by using only the first connector 300 of the first aspect, using only the connector 300 of the second aspect, or using both the connector 300 of the first aspect and the connector 300 of the second aspect, it may be possible to connect battery cells 100 having different voltages.

Figure 8:
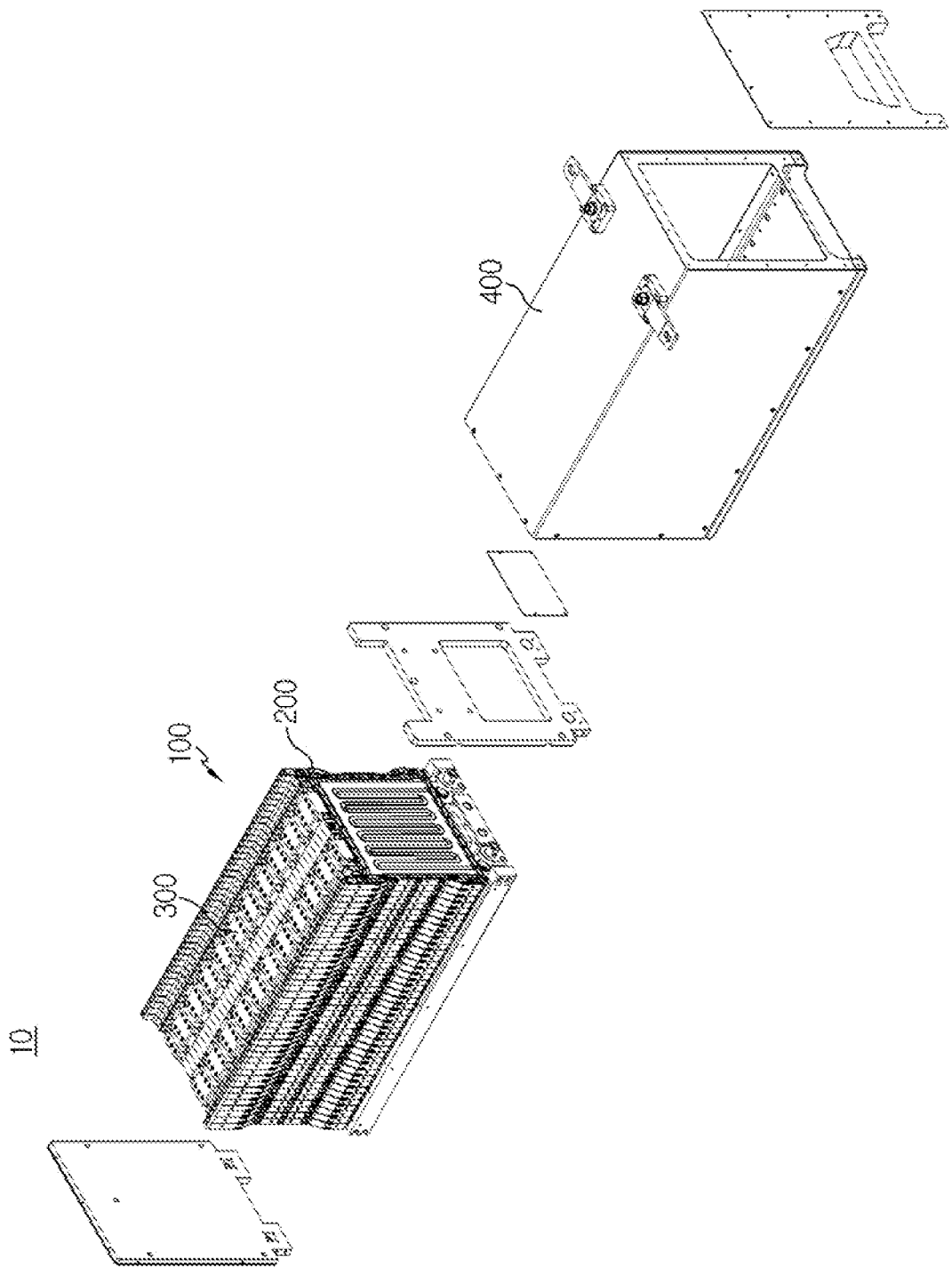
FIG. 8 is an exploded perspective view illustrating a battery module according to an aspect of the present disclosure.
Figure 9:
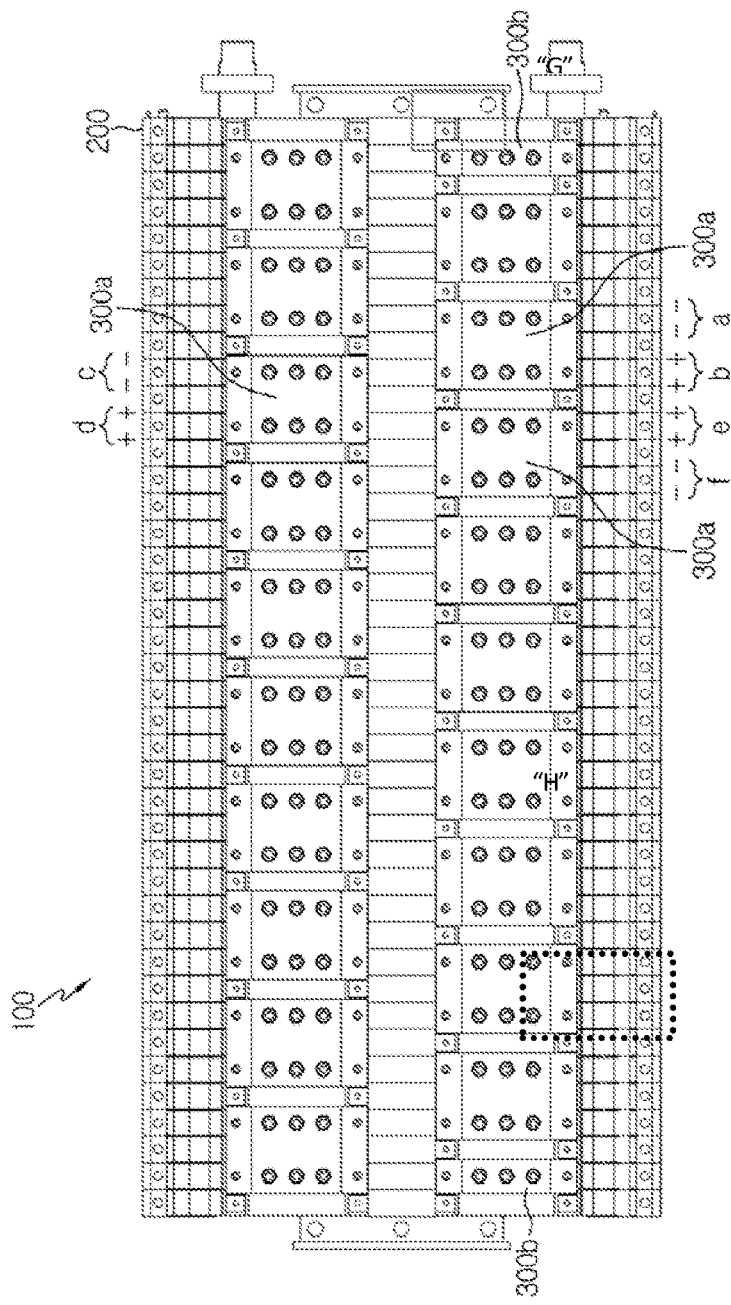
FIG. 9 is a side view illustrating the state in which a connector is coupled to battery cells in the battery module of FIG. 8 according to an aspect of the present disclosure.
Figure 10:
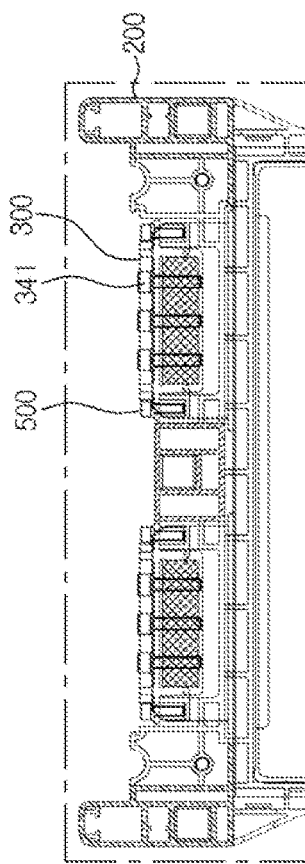
FIG. 10 is a side cross-sectional view illustrating the state in which a connector is coupled to a cell cartridge included in the battery module of FIG. 8 according to an aspect of the present disclosure.

FIG. 8 is an exploded perspective view illustrating a battery module or pack according to an aspect of the present disclosure. FIG. 9 is a side view illustrating the state in which a connector may be coupled to battery cells in the battery module of FIG. 8, and FIG. 10 is a side cross-sectional view illustrating the state in a connector may be coupled to a cell cartridge included in the battery module of FIG. 8. FIG. 9 illustrates the inside of a battery module from which a cover may be detached. As used herein, the term battery module means a group of battery cells enclosed in a housing and comprising external terminals to the housing for electrically connecting the battery module(s) inside the housing to voltage sources and/or loads outside the housing, such as the electrical system of a vehicle, building, grid-tied storage battery system, and/or the like. Other packages of battery cells may be called cell packs, battery packs, cell modules, or the like, and the herein the term battery module or module will be used to mean any group or collection battery cells incorporated therein.

Hereinafter, a battery module 10 according to an aspect of the present disclosure may be described with reference to the drawings. In the battery module 10 according to an aspect of the present disclosure, a plurality of battery cells 100 may be electrically connected to each other by the connector 300 described above. The connector 300 may be provided in various types, and a plurality of battery cells 100 may be connected in series, in parallel, or in series and parallel using various connectors 300 to finally generate a desired voltage.

Referring to FIGS. 8 and 9, for example, the battery cells 100 in FIGS. 8 and 9 may be connected in series using both the connector 300a of the first aspect and the connector 300b of the second aspect.

The electrode leads of a and b, the electrode leads of c and d, and the electrode leads of e and f in FIG. 9 may be respectively connected by the connectors 300a of the first aspect, the electrode leads of g in FIG. 9 are connected by the connector 300b of the second aspect, and the electrode leads of h may be also connected by the connector 300b of the second aspect.

The two negative electrode leads of a in FIG. 9 may be brought into close contact with the contact portions 313 of the main body 310 by the push members 320, and two positive electrode leads 110 of b in FIG. 9 may be brought into close contact with the contact portions 313 of the main body 310, and the electrode leads of a and b in FIG. 9 may be connected to each other by one connector 300*a* of the first aspect (see FIGS. 2 and 3). Like the electrode leads of a and b in FIG. 9, the electrodes of c and d in FIG. 9 may be also connected to each other by one connector 300*a* of the first aspect, and like the electrode leads of a and b in FIG. 9, the electrode leads of e and f in FIG. 9 may be connected to each other by one connecter 300*a* of the first aspect. In addition, since the positive electrode leads 110 of b in FIG. 9 and the negative electrode leads 110 of c in FIG. 9 may be the electrode leads 110 formed in one battery cell 100, electric connection in the order of a-b-c-d-e-f may be passible, and since different polarities may be continuously connected in the state in which the positive and negative electrodes cross according to the above-mentioned order, such as in an alternating pattern, the electrode leads may be connected in series as a whole. In addition, various devices for receiving power from the battery cells 100 may be connected through the electrode leads of g and h in FIG. 9 disposed at both ends. However, the connection method of FIG. 9 is merely an example, and the electrode leads 110 of the same polarity may be connected using the connectors 300 to implement parallel connection.

Meanwhile, the battery module 10 according to an aspect of the present disclosure may include a cell cartridge 200 in order to stack a plurality of battery cells 100 one on another, and the cell cartridge 200 may be configured to support the plurality of battery cells 100. The cell cartridge 200 may be manufactured through injection molding of plastic, and a plurality of cell cartridges 200 may be sucked in the state of supporting the battery cells 100. The cell cartridge 200 may be accommodated in a case 400, and the battery cells 100 supported by the cell cartridge 200 may be accommodated inside the case 400 to be protected. In addition, the cell cartridge 200 may be provided with connector elements (not illustrated) or terminal elements (not illustrated). The connector elements (not illustrated) may include various types of electrical connection component (not illustrated) or connection members to be connected to, for example, a battery management system (BMS), which may provide, for example, data on the voltage or temperature of the battery cells 100. In addition, the terminal elements (not illustrated) may include a positive electrode terminal and a negative electrode terminal as main terminals connected to the battery cells 100, and each terminal element may be provided with a terminal element (not illustrated) so as to be electrically connected to the outside.

Here, referring to FIG. 10, the connector 300 may be coupled to various positions of the cell cartridge 200, for example, on the upper side of the cell cartridge 200. That is, the connector 300 may be coupled to and supported on the upper side of the cell cartridge 200 by fastening members 500 such as bolts or screws.

Meanwhile, a battery pack (not illustrated) according to an aspect of the present disclosure may include at least one battery module 10 according to an aspect of the present disclosure described above. In addition to the battery module 10, the battery pack (not illustrated) may further include a case for accommodating the battery module 10, and various devices for controlling the charging and discharging of the battery module 10, such as a BMS, a current sensor, and a fuse.

Meanwhile, a vehicle (not illustrated) according to an aspect of the present disclosure may include the battery module 10 described above or a battery pack (not illustrated), and the battery pack (not illustrated) may include the battery module 10. In addition, the battery module 10 according to an aspect of the present disclosure may be applied to a vehicle (not illustrated) which may use electricity, such as an electric vehicle or a hybrid vehicle.

While the present disclosure has been described above with reference to several aspect s thereof, the present disclosure is not limited by the aspect s, and that various changes and modifications may be made by a person ordinarily skilled in the art without departing from the technical spirit and equivalent scope of the present disclosure as defined by the appended claims.

The invention claimed is:

1. A connector comprising:
   a conductive main body comprising contact portions provided to face each other, wherein the contacting portions are configured to compress a plurality of electrode leads of neighboring battery cells;
   two push members each comprising a level surface and an inclined surface on opposing sides of each push member, wherein each push member is configured to be movable and spaced between the contact portions, wherein each push member is configured to compress the plurality of electrode leads with a corresponding contact portion;
   a core member comprising a second inclined surface, wherein the core member is configured to be movable in a parallel direction to the contact portion, wherein the core member is located between the two push members, wherein the core member is configured to compress the two push members against the conductive main body; and
   a movement mechanism configured to move the core member in the parallel direction and compress the plurality of electrode leads between the conductive main body and the push members.

2. The connector of claim 1, wherein the movement mechanism comprises:
   at least one fastening hole formed in the conductive main body;
   at least one threaded hole formed in the core member; and
   a bolt member inserted into the fastening hole and the threaded hole and passing through a space between the two push members.

3. The connector of claim 2, wherein the bolt member is located on an upper side of the conductive main body, the core member is located on a lower side of the conductive main body, and the two push members are interposed between the conductive main body and the core member.

4. The connector of claim 1, wherein the plurality of electrode leads moves from a lower side to an upper side of the conductive main body so as to be inserted between the conductive main body and the two push members.

5. The connector of claim 1, wherein, when the core member moves in the parallel direction the two push members move in the perpendicular direction, and the plurality of electrode leads are compressed between the conductive main body and the two push members.

6. The connector of claim 1, wherein the two push members are disposed to face each other.

7. The connector of claim 1, wherein each electrode lead of the plurality of electrode leads comprises a flat surface or linear surface, and wherein the contacting portions comprise a corresponding flat or linear surface.

8. The connector of claim 1, wherein each electrode lead of the plurality of electrode leads comprises a battery tab.

9. The connector of claim 2, wherein the core member is brought into contact with the two push members on a lower side of the two push members, and the bolt member is coupled to the core member from an upper side of the core member.

10. A battery module comprising:
- a housing comprising a plurality of external terminals extending from the interior of the housing to an external electrical source or load;
- a plurality of battery cells electrically interconnected by a plurality of connectors in an alternating pattern to provide serial electrical connections among the plurality of battery cells and to the external terminals; and
- the plurality of connectors, each connector of the plurality of connectors comprising:
  - a conductive main body comprising contact portions provided to face each other, wherein the contacting portions are configured to compress a plurality of electrode leads;
  - two push members each comprising a level surface and an inclined surface on opposing sides of each push member, wherein each push member is configured to be movable and spaced between the contact portions, wherein each push member is configured to compress the plurality of electrode leads with a corresponding contact portion;
  - a core member comprising a second inclined surface, wherein the core member is configured to be movable in a parallel direction to the contact portion, wherein the core member is located between the two push members, wherein the core member is configured to compress the two push members against the conductive main body; and
  - a movement mechanism configured to move the core member in the parallel direction and compress the plurality of electrode leads between the conductive main body and the push members.

11. The battery module of claim 10, wherein the movement mechanism comprises:
- at least one fastening hole formed in the conductive main body;
- at least one threaded hole formed in the core member; and
- a bolt member inserted into the fastening hole and the threaded hole and passing through a space between the two push members.

12. The battery module of claim 11, wherein the bolt member is located on an upper side of the conductive main body, the core member is located on a lower side of the conductive main body, and the two push members are interposed between the conductive main body and the core member.

13. The battery module of claim 10, wherein the plurality of electrode leads moves from a lower side to an upper side of the conductive main body so as to be inserted between the conductive main body and the two push members.

14. The battery module of claim 10, wherein, when the core member moves in the parallel direction, the two push members move in the perpendicular direction, the plurality of electrode leads are compressed between the conductive main body and the two push members.

15. The battery module of claim 10, wherein the two push members are disposed to face each other.

16. The battery module of claim 10, wherein each electrode lead of the plurality of electrode leads comprises a flat surface or linear surface, and wherein the contacting portions comprise a corresponding flat or linear surface.

17. The battery module of claim 10, wherein each electrode lead of the plurality of electrode leads comprises a battery tab.

18. The battery module of claim 11, wherein the core member is brought into contact with the two push members on a lower side of the two push members, and the bolt member is coupled to the core member from an upper side of the core member.

19. The battery module of claim 10, further comprising:
- a cell cartridge configured to support the plurality of battery cells in order to stack the plurality of battery cells one on another, wherein the plurality of connectors are coupled to the cell cartridge.

20. A vehicle comprising a battery module, the battery module comprising:
- a housing comprising a plurality of external terminals extending from the interior of the housing to an external electrical source or load;
- a plurality of battery cells electrically interconnected by a plurality of connectors in an alternating pattern to provide serial electrical connections among the plurality of battery cells and to the external terminals; and
- the plurality of connectors, each connector of the plurality of connectors comprising:
  - a conductive main body comprising contact portions provided to face each other, wherein the contacting portions are configured to compress a plurality of electrode leads;
  - two push members each comprising a level surface and an inclined surface on opposing sides of each push member, wherein each push member is configured to be movable and spaced between the contact portions, wherein each push member is configured to compress the plurality of electrode leads with a corresponding contact portion;
  - a core member comprising a second inclined surface, wherein the core member is configured to be movable in a parallel direction to the contact portion, wherein the core member is located between the two push members, wherein the core member is configured to compress the two push members against the conductive main body; and
  - a movement mechanism configured to move the core member in the parallel direction and compress the plurality of electrode leads between the conductive main body and the push members.

* * * * *